United States Patent
Hollstein et al.

[19]

[11] Patent Number: 6,002,976

[45] Date of Patent: Dec. 14, 1999

[54] TRANSMISSION SHIFT CONTROL SYSTEM AND METHOD

[75] Inventors: Jürgen Hollstein; Tilo Kempf, both of Mannheim, Germany

[73] Assignee: Deere & Company, Moline, Ill.

[21] Appl. No.: 09/168,785

[22] Filed: Oct. 8, 1998

[30] Foreign Application Priority Data

Oct. 25, 1997 [DE] Germany ............................ 197 47 262

[51] Int. Cl.$^6$ ................................................. G06F 15/00
[52] U.S. Cl. ................ 701/51; 701/52; 701/53; 701/54; 701/67; 701/68; 701/69; 477/34; 477/37; 477/39; 477/46
[58] Field of Search ................ 701/51–54, 67–69; 477/34, 37, 39, 46

[56] References Cited

U.S. PATENT DOCUMENTS

| | | | |
|---|---|---|---|
| 4,324,153 | 4/1982 | Sugimoto et al. | 74/866 |
| 4,425,620 | 1/1984 | Batcheller et al. | 701/52 |
| 4,722,248 | 2/1988 | Braun | 74/866 |
| 5,109,730 | 5/1992 | Zahn et al. | 74/866 |
| 5,152,191 | 10/1992 | Sato et al. | 701/51 |
| 5,435,212 | 7/1995 | Menig | 74/745 |

FOREIGN PATENT DOCUMENTS

| | | |
|---|---|---|
| 0 406 712 A2 | of 0000 | European Pat. Off. |
| 0 547 829 A2 | of 0000 | European Pat. Off. |
| 0 595 496 A2 | of 0000 | European Pat. Off. |
| 0 644 360 A1 | of 0000 | European Pat. Off. |
| 0 709 598 A2 | of 0000 | European Pat. Off. |
| 2304835 | of 0000 | United Kingdom. |

Primary Examiner—William A. Cuchlinski, Jr.
Assistant Examiner—Yonel Beaulieu

[57] ABSTRACT

A vehicle power shift transmission (PST) is controlled by a transmission control system which implements a control method. The PST is part of the driveline of the vehicle and is shifted by an actuating mechanism. The driveline includes an engine, the PST, a clutch, a synchronized shift transmission that can be shifted by a shift lever and driven vehicle wheels. In order to simplify the operator's tasks, during the shift of the synchronized shift transmission the gear of the PST is automatically shifted so that the resulting difference in the gear ratio of the complete transmission before and after the shift is minimized. The gear of the PST is selected and shifted automatically so that the rotational speeds on both sides of the clutch differ as little as possible.

19 Claims, 4 Drawing Sheets

TRANSMISSION SHIFT CONTROL SYSTEM AND METHOD

BACKGROUND OF THE INVENTION

The invention relates to a control system and method for controlling a power shift transmission of a utility vehicle, such as an agricultural tractor.

It is known to provide an agricultural tractor with a power shift transmission which can be shifted under load. The driveline for such a vehicle typically includes an engine, a power shift transmission controlled by actuating mechanism, a clutch, a synchronized transmission that can be shifted by a shift lever, and driven vehicle wheels.

Commercially available agricultural tractors, such as John Deere tractors in the 6000 series, have drivelines which are driven by an internal combustion engine and which include a shifted multi-speed transmission, a reversing unit, a clutch, an optional creeper transmission, a shifted range transmission, a rear axle differential and the driven rear wheels. The shifted multi-speed transmission is configured as a power shift transmission, (also called a partial power shift transmission) and includes planetary gear sets with clutches and brakes. Such a transmission may be shifted under load. Gear shift control signals are transmitted from a gearshift lever to a control unit which controls an actuating mechanism which causes the power shift transmission to shift. The range shift transmission is a fully synchronized shifted transmission whose ranges can be actuated by a range shift lever. A direction control lever is used for the shifting of the reversing unit between forward and reverse directions. This known driveline has a smooth succession of gear ratios and makes possible shifting under load within a selected range of gear ratios. The operator must manipulate two gearshift levers in order to utilize the smooth succession of gear ratios and adjust the gear ratio of the power shift transmission during a shift of the range transmission for many gear ratio combinations.

SUMMARY OF THE INVENTION

Accordingly, an object of this invention is to provide an improved transmission control system and method.

A further object of the invention is to provide such a improved transmission control system which provides improvement in the shifting comfort.

These and other objects are achieved by the present invention, wherein an engine driven driveline of a utility vehicle includes a power shift transmission that can be shifted by an actuating mechanism, a clutch, a synchronized shift transmission that can be shifted by a shift lever and driven vehicle wheels. The synchronized shift transmission is preferably configured as a range transmission. The transmission control contains a clutch sensor, that determines whether the clutch is disengaged or engaged, and at least two rotational speed sensors to determine rotational speed on both sides of the clutch and an electronic control unit.

The primary focus of the present invention is that during a gearshift of the synchronized shift transmission, the gear ratio of the power shift transmission is automatically so that the rotational speeds on either side of the clutch differ as little as possible. This simplifies the tasks of operator since during a shift that requires a shift in the gear ratio of the synchronized shift transmission, the operator need only disengage the clutch and operate the shift lever of the synchronized shift transmission. An appropriate adjustment of the power shift transmission to comply is then performed automatically.

The transmission control system evaluates the signals from the clutch sensor to determine the engagement status of the clutch, evaluates the signals of the rotational speed sensors to determine the actual, measured rotational speed differences between the input shaft and the output shaft of the clutch for the gear ratio currently engaged and for other gear ratios that are available in the power shift transmission, selects the gear ratio of the power shift transmission that result in the least possible rotational speed differences, and transmits control signals to the actuating mechanism to automatically engage the selected gear ratio, as long as the clutch is disengaged.

The control system performs the following method or process steps: Determination of the engagement status of the clutch by means of a clutch sensor, evaluation of the signals of the speed sensors in order to evaluate the actual rotational speed differences between the input shaft and the output shaft of the clutch for the available gear ratios in the power shift transmission, selection of the gear ratio of the power shift transmission that result in the least possible rotational speed differences and actuation of the actuating mechanism of the power shift transmission to maintain or to automatically engage the selected gear, as long as the clutch is disengaged. The method or process of the invention is implemented by an algorithm executed by an electronic control unit. This algorithm becomes active at the time that the clutch is disengaged in order to engage a new gear ratio or a different range in the synchronized shift transmission.

With this algorithm the resulting change in the total transmission gear ratio across both transmissions can be held to a minimum during a change in gear ratio in the synchronized shift transmission. This makes possible a rapid, smooth re-engagement of the clutch. Beyond that, the operator is relieved of some of the tasks during a gear shift, since even with relatively large steps in the gear ratio, as they are usual in a synchronized shift transmission designed as a range transmission, the operator need only actuate the shift lever of the synchronized shift transmission and need not perform any manual adjustment of the power shift transmission, also called partial power shift transmission. Upon downshifting of the synchronized shift transmission a higher gear ratio may be selected, if necessary, in the power shift transmission, and the inverse. If the vehicle comes to a standstill during operation, then preferably the lowest gear ratio in the power shift transmission is automatically engaged.

Even though the speed sensors are not applied directly to the input shaft or the output shaft of the clutch, the clutch shaft speeds can be calculated by the control unit based upon the speed ratios of transmission components between the particular speed sensor and the clutch. Therefore, it is possible to utilize an engine speed sensor for this purpose.

In a preferred embodiment of the invention, a first speed sensor senses the speed of a part of the driveline between the engine and the power shift transmission, which is located upstream of the clutch, and a second speed sensor senses rotational speeds between the clutch and the following synchronized shift transmission. The control unit calculates corresponding input rotational speeds for the clutch, as a function of signals of the first speed sensor and each gear available in the power shift transmission, and then compares this result with the sensed speed at the clutch output shaft, and determines for each gear ratio the associated rotational speed variations, such as a rotational speed differences or rotational speed ratios.

In another embodiment, when the algorithm continuously evaluates the speed sensor signals and calculates theoretical speed ratios for the power shift transmission which would result in equal rotational speeds on both sides of the clutch. A gear is then selected for the power shift transmission whose actual gear ratio is as close as possible to the calculated theoretical gear ratio.

Among other causes, when the clutch is disengaged, the theoretical gear ratio changes with the engine rotational speed and the vehicle velocity. In corresponding manner, the selected gear ratio also conforms to these operating conditions. Upon the automatic selection of the gear ratio of the power shift transmission, the algorithm therefore makes possible during the engagement of the clutch a consideration of actual boundary conditions such as, for example, an upgrade in the road or a downgrade in the road as well as the load on the vehicle.

Preferably, the shift into a new gear ratio in the power shift transmission occurs with the inclusion of a hysteresis that results in a stable shift performance. For example, the limit values for the automatic shift to a higher gear ratio than the previous gear ratio are at lower measured gear ratios than the limit values for the automatic shift into a lower gear ratio than the previous gear ratio. In other words, for an upshift of the power shift transmission into a higher gear the shift point lies at a higher rotational speed of the output shaft of the clutch as under equal conditions during a downshift of the power shift transmission.

Preferably, an automatic shift of the power shift transmission is performed only if the gear ratio of the synchronized shift transmission was changed during the disengagement of the clutch. Therefore, in another embodiment the gear ratio of the synchronized shift transmission is detected and control signals are transmitted for the automatic shifting of the power shift transmission only if, after the disengagement of the clutch, a shift in the gear ratio of the synchronized shift transmission has been detected.

To detect the gear detection of the synchronized shift transmission, the rotational speed on both sides of the synchronized shift transmission are sensed and their ratio is compared with values stored in memory which correspond to the gear ratios available in the power shift transmission. For this purpose, for example, the aforementioned second speed sensor may be used to detect the rotational speed of the input shaft of the synchronized shift transmission, and a third speed sensor used to detect a rotational speed corresponding to the vehicle speed. If this speed ratio changes by a predetermined amount this is detected as a gear shift.

The driveline may include a reversing unit which can be controlled by an operating device, such as a reversing lever. As long as the gear ratio steps here are equal for forward and reverse operation, the control of the gear ratio compliance can be performed without regard to the direction of operation. However, if the gear ratio steps are unequal, so that, for example, higher gear ratios are used in reverse operation compared to those used in forward operation, then the control requires information as to the direction of operation, in order to perform an optimum gear ratio compliance. Therefore, the direction of operation or status of the reversing unit is detected, and this information is used in the evaluation of the gear ratios of the power shift transmission and/or the synchronized shift transmission. If speed sensors are utilized from whose signals the direction of operation can be derived, the signals of the speed sensors can be employed for the evaluation in place of a separate direction of operation sensing component. An indicator displays the gear ratio currently engaged in the power shift transmission so that the operator is informed.

DETAILED DESCRIPTION

Figure 1:
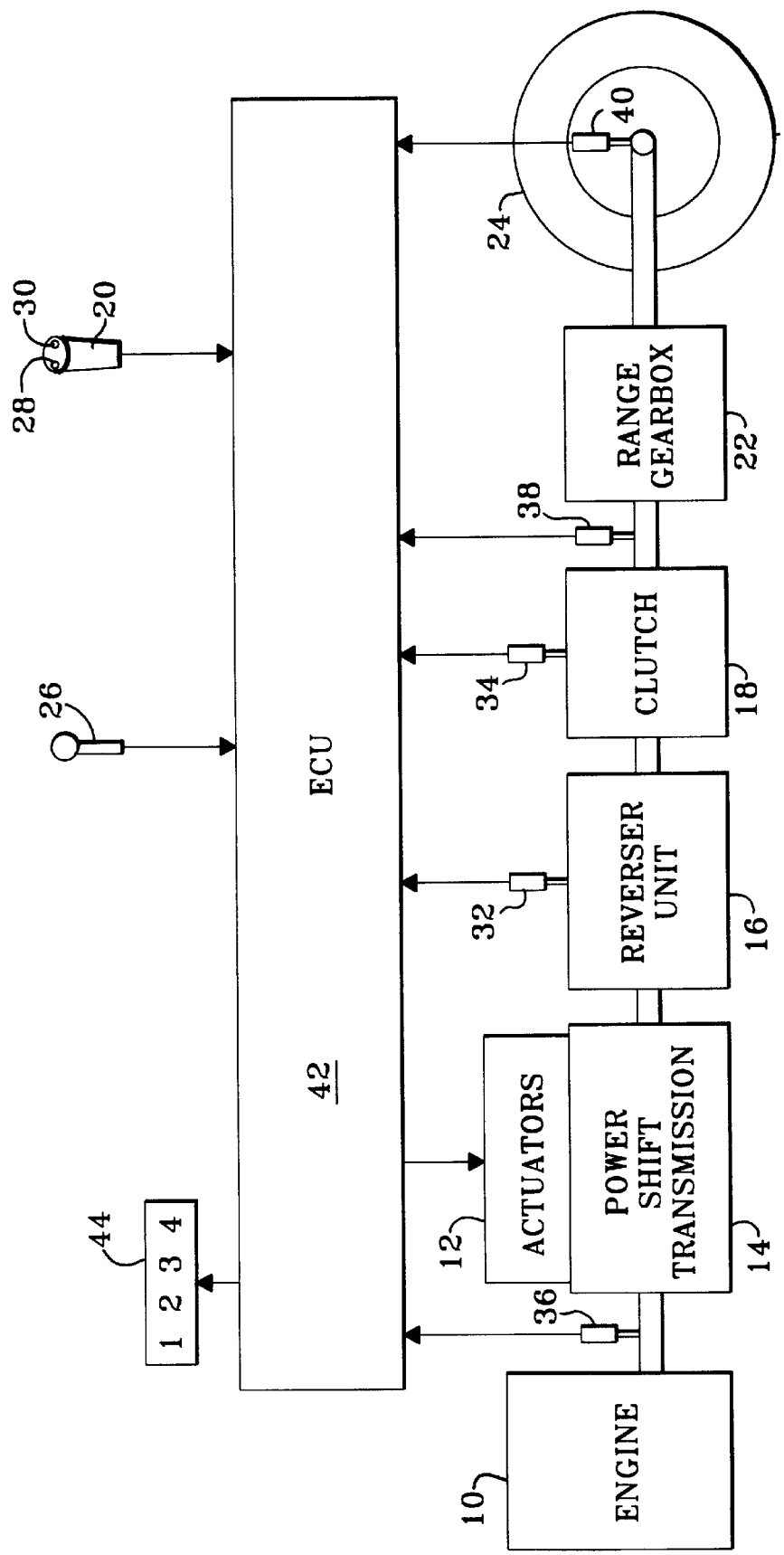
FIG. 1 is a schematic block diagram of a control system and a driveline for an agricultural tractor.

A shown in FIG. 1, the driveline of an agricultural tractor (not shown) contains an engine 10, a power shift transmission (PST) 14 which is shifted by an actuating mechanism 12, a reversing unit 16, a clutch 18, a synchronized shift transmission 22 which is shifted by a shift lever 20 and driven vehicle wheels 24 of which only one is shown. The PST 14 is preferably a partial power shift transmission for shifting gears under load. A control unit 42 transmits corresponding electrical signals for the shifting of gear ratios to the actuating mechanism 12 which controls the PST 14 by means of electric or hydraulic signals. The synchronized shift transmission 22 is configured as a range transmission. The reversing unit 16 is used to shift between forward operation and reverse operation and can be shifted by a reversing lever 26. Two push button switches 28, 30 are arranged in an ergonomically favorable location on the handgrip of the shift lever 20. Switches 28, 30 permit step-by-step manual upshifting and downshifting of the PST 14. The reversing unit 16 and/or the clutch 18 may be integrated into a housing of the PST 14. The actuating mechanism 12 transmits electrical or hydraulic signals to the PST 14, causing it to shift to the desired gear.

The control system further includes an operating direction sensor 32, a clutch sensor 34, a first speed sensor 36 for sensing the rotational speed of the engine 10, a second speed sensor 38 for sensing the rotational speed of an output shaft of the clutch, a third speed sensor 40 to determine the rotational speed of the vehicle velocity and an electronic control unit 42. A gear status indicator 44 indicates the gear ratio currently engaged in the PST 14. The control unit 42 receives signals from the operating direction sensor 32, the clutch sensor 34, the three speed sensors 36, 38, 40 and the two push button switches 28, 30. It transmits control signals to the actuating mechanism 12 and the gear status indicator 44.

Figure 2:
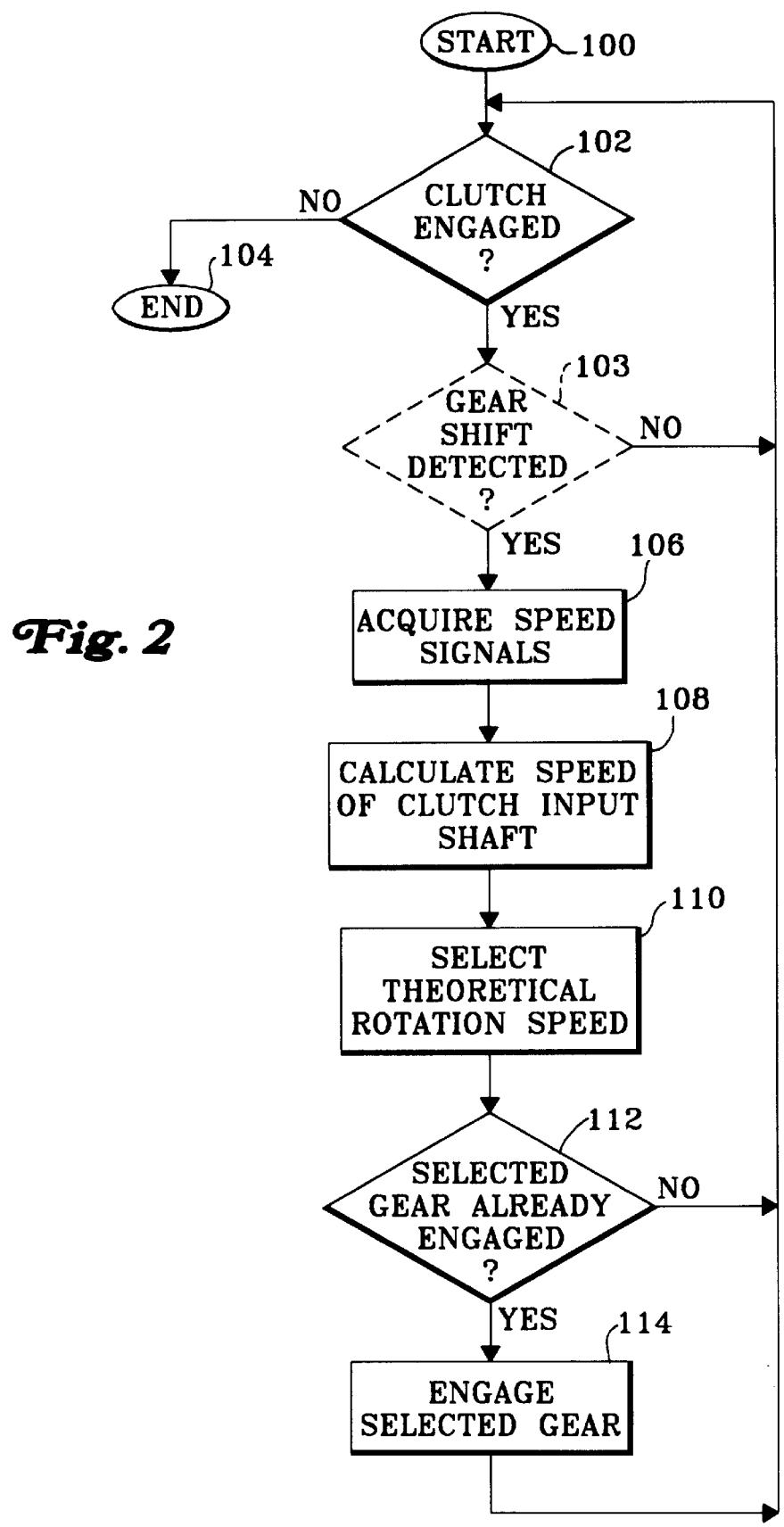
FIG. 2 is logic flow diagram of an algorithm executed by the control system of FIG. 1.

The control unit executes the algorithm illustrated by FIG. 2. If the clutch sensor 34 signals that the clutch 18 is disengaged, the algorithm is initiated in step 100 by means of which another gear may be engaged in the PST 14 automatically if necessary. Step 102 tests whether the clutch is still disengaged. If the clutch is engaged the algorithm is ended in step 104. If the clutch 18 is disengaged the control unit 42 acquires the signals of the speed sensors 36 and 38, and, if applicable, 40 in step 106. Then, in step 108 for each available gear combination of the PST 14, with respect to the selected direction of operation, the rotational speeds are continuously calculated that would result at the input shaft of the clutch for the engine rotational speeds measured by the first speed sensor 36.

For this purpose the control unit 42 initially determines the condition of the reversing unit 16 on the basis of the signals from the operating direction sensor 32 and refers to the associated gear ratio of the reversing unit 16 as stored in the control unit 42. This gear ratio is then multiplied by the stored gear ratios of each gear available in the PST 14, so that a factor results for each gear ratio. The actual engine rotational speed value as measured by the first speed sensor 36 is continuously multiplied by these factors, so that for each gear ratio there results an associated theoretical rotational speed value for the input shaft of the clutch, which depends upon the engine rotational speed.

For a transmission with four gears and a reversing unit 16 with differing gear ratios for forward and reverse operation, four factors for each direction can be calculated (product of factors for the gear ratios of the PST 14 and the reversing unit 16). Table 1 shows examples of appropriate gear ratios in order to define the calculation processes more clearly.

TABLE 1

| Transmission | Gear | Gear ratio |
| --- | --- | --- |
| PST | 1 | 1.767 |
| PST | 2 | 1.466 |
| PST | 3 | 1.225 |
| PST | 4 | 1.000 |
| Reversing unit | Forward | 1.000 |
| Reversing unit | Reverse | −0.843 |

From these values for the four forward gear, these factors can be calculated: 1.767, 1.466, 1.225 and 1.000 and for the four reverse gears the factors −1.490, −1.236, −1.033 and −0.843. The measured values from the first speed sensor 36 are multiplied by the factors for forward operation or the factors for reverse operation, so that four rotational speeds are available for each selected direction of operation. These are the theoretical rotational speeds of the clutch input shaft associated with the individual gears. For each individual gear engaged in the PST 14 the theoretical rotational speed is equal to the actual input rotational speed of the clutch.

This results in four theoretical rotational speeds for the forward gears and four theoretical rotational speeds for the reverse gears. In step 110 the theoretical rotational speeds are compared with the output rotational speed of the clutch, which are detected by the second speed sensor 38. Step 110 selects from the theoretical rotational speeds the one that most closely approaches the rotational speed measured at the clutch output shaft. The selected rotational speed defines a selected gear of the PST 14.

Alternatively, step 110 could derive a quotient from the measured rotational speeds of the first speed sensor 36 and the second speed sensor 38. This quotient is compared with values of the gear ratios of the PST 14 stored in the control unit 42, if necessary with consideration of the reversing unit 16. The algorithm selects the gear of the PST 14 whose gear ratio deviates the least from the quotient.

Figure 3:
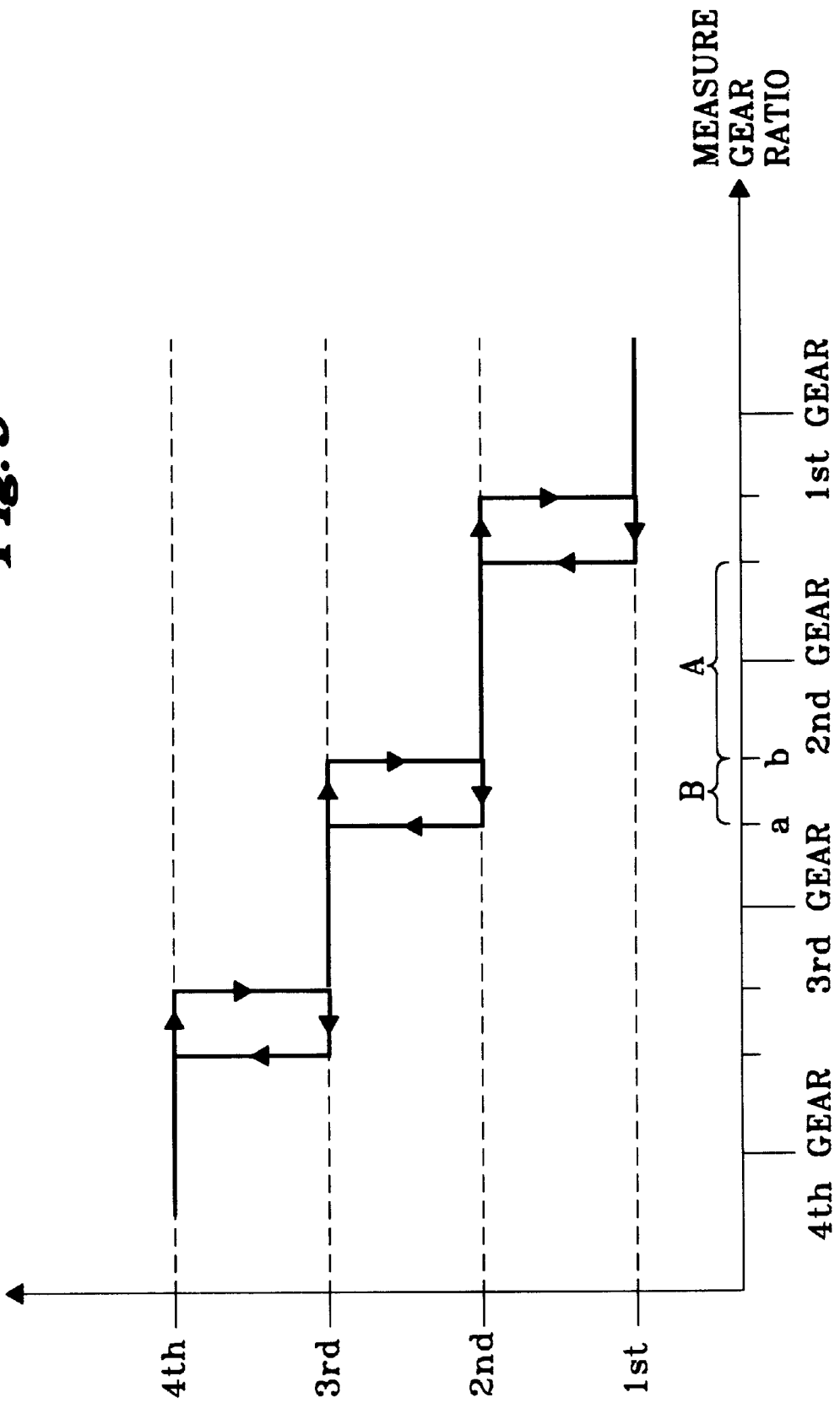
FIG. 3 is a diagram which illustrates the hysteresis performance of the gear selection operation of the control system of FIG. 1.

Referring now to FIG. 3, in order to avoid uncertainties during automatic shifting between the gears of the PST 14 a hysteresis-type method or algorithm may be used in connection with gear selection. In FIG. 3 the gear to be selected by step 110 is shown above the measured (theoretical) gear ratio. The measured gear ratio is the quotient of the measured rotational speed values of the first speed sensor 36 (ahead of the PST) and of the second speed sensor 38 (after the clutch). The fixed gear ratios of four gears of the PST 14 are entered along the abscissa. FIG. 3 shows which gear is to be selected for a measured gear ratio. If the measured gear ratio lies close to a fixed gear ratio of the PST 14, for example, in the vicinity of the gear 2 (that is in the region A) then the gear to be selected is clearly indicated (for the region A it is the gear 2). However, if the measured gear ratio lies in the region between two fixed gear ratios of the PST 14 (for example, between the gears 2 and 3, that is, in the region B), then the selection of the gear depends upon the previous status of the PST 14.

For a shift to a higher gear than the previous gear the threshold values are located at smaller measured gear ratios as compared to a shift to a lower gear than the previous gear. This is indicated by arrows in FIG. 3. If, for example, the PST 14 is initially in second gear, then the measured gear ratio must fall below the value a, in order to select third gear. If, on the other hand, the PST 14 is initially in third gear, then the measured gear ratio must increase above the value b, in order to select second gear. Here b is greater than a.

Referring again to FIG. 2, in step 112 a test is made on the basis of the signals previously transmitted to the actuating mechanism 12, whether the gear selected in step 110 for the PST 14 has already been engaged. If this is the case, the algorithm continues with step 102. Otherwise, the control unit 42 transmits signals to the actuating mechanism 12 to shift the PST 14. Subsequently, the algorithm continues with step 102. In order for the operator to verify at all times which gear is currently engaged, the gear engaged in the PST 14 is indicated by the gear status indicator 44.

It is desirable for the operator to be able to freely select the gear of the PST 14. For this purpose two push button switches 28, 30 are arranged on the handgrip of the shift lever 20. By pressing the one push button switch 28 once or multiple times the PST 14 can be upshifted step by step, by pressing the other push button switch 30 it can be downshifted step by step. If one of the two push button switches 28, 30 is pressed, the algorithm is interrupted for a predetermined time interval or until a renewed disengagement of the clutch. The engagement of the gears of the PST 14 is now performed exclusively by the shift signals transmitted by the push button switches 28, 30. The switches 28, 30 allow the operator to manually select and engage the gear ratio of the synchronized shift transmission, a manually operated operating arrangement is provided. It is advantageous that upon actuation of the switches 28, 30 an automatic adjustment of the PST 14 is overridden or suppressed. The overriding or suppression can be maintained until the clutch 18 is engaged and then disengaged at a later time. A simple manual control of the synchronized shift transmission can preferably be performed by the push button switches, one of which is used for the step-by-step upshift and the other for the step-by-step downshift of the PST. Preferably, the two push button switches 28, 30 are arranged on the handgrip of the shift lever 20.

Preferably, the algorithm is only performed if a gear shift of the synchronized shift transmission 22 has occurred since the disengagement of the clutch 18. For this purpose a further step 103, shown in dashed lines, can be inserted into the algorithm shown in FIG. 2 between steps 102 and 106. Step 103 evaluates the signals of the second speed sensor 38 and the third speed sensor 40 in order to determine the gear engaged in the synchronized shift transmission 22. For example, by forming the quotient of the two measured values and comparing it with values of the gear ratios of the synchronized shift transmission 22 stored in the control unit 42. If, since the beginning of the algorithm initiated by step 100, no gear shift—or shift in range—has been performed in the synchronized shift transmission 22, then the sequence is returned to step 102. If a gear shift is detected, the algorithm continues with step 106.

Figure 4:
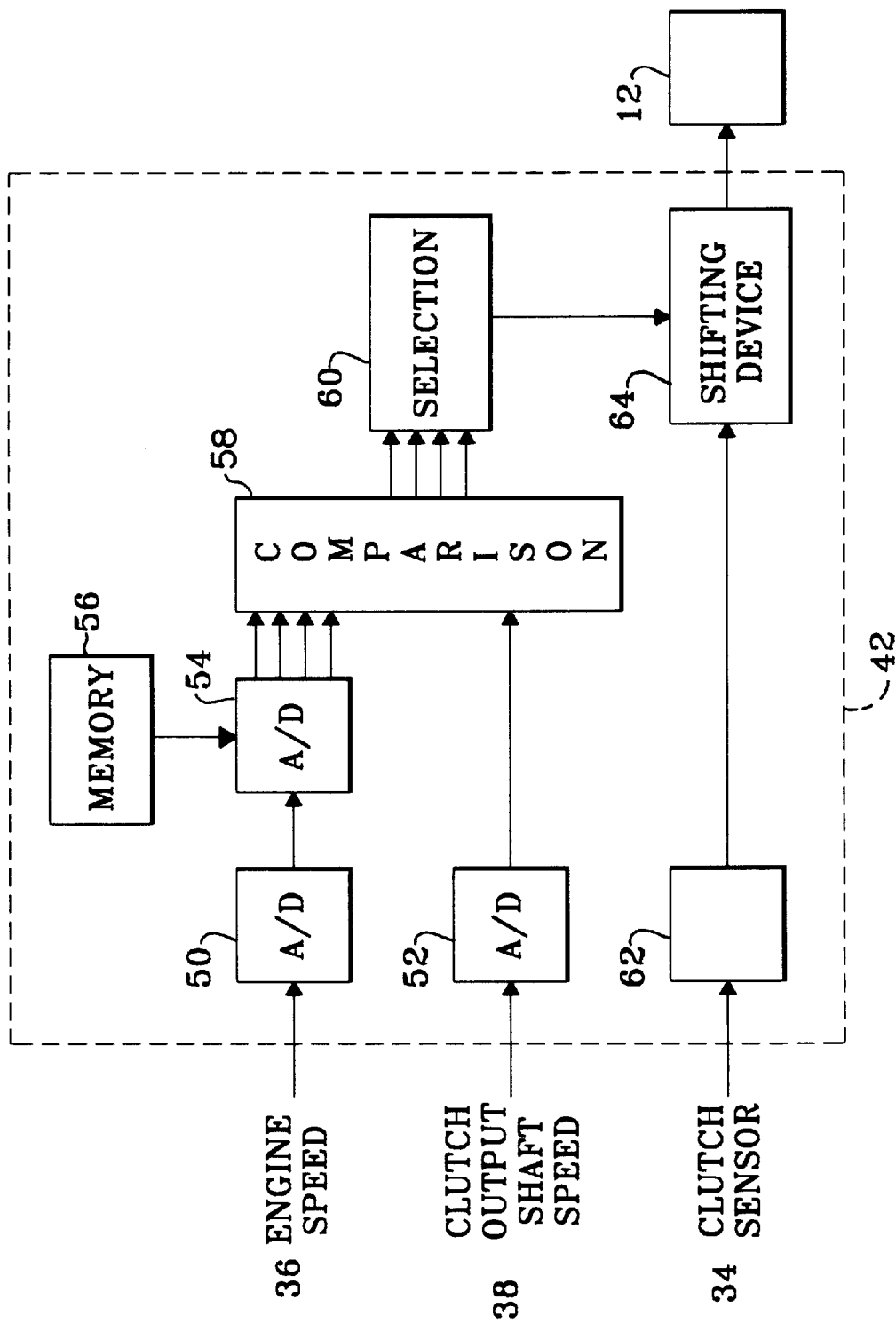
FIG. 4 is a schematic circuit diagram of the control unit of FIG. 1.

Instead of a control algorithm executed by the control unit 42, the control unit 42 may comprise circuit elements which generates the control signals for the actuating mechanism 12 as shown in FIG. 4. Accordingly, such circuit elements include evaluation unit 50, 52 which receive, condition and digitize the speed signals from the first and second speed sensors 36, 38. The output signals of the evaluation unit 50 are multiplied in a multiplication unit 54 with the predetermined gear ratios of the PST 14, which are acquired from a memory 56 in order to calculate theoretical rotational speeds at the input shaft of the clutch 18 for each gear ratio. Thereby, an associated theoretical rotational speed value is issued for each gear ratio. The theoretical rotational speed values (that correspond to the four arrow shown) are compared in a comparator 58 with the output signals of the evaluation unit 52, which correspond to the actual rotational speeds at the output shaft of the clutch 18. The comparator 58 transmits for each gear ratio a rotational speed difference signal to a selecting unit 60. The selecting unit 60 determines the gear for the PST 14 for which the lowest rotational speed difference signal is found. It transmits corresponding shift signals for the PST 14. The signals of the clutch sensor 34 are processed in an evaluation unit 62, which transmits signals to a shifting device 64 which correspond to the engaged/disengaged status of the clutch. The shifting device 64 transmits the signals of the selecting unit 60 to the actuating mechanism 12 only if the clutch 18 is disengaged.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. For example, it is possible to arrange the speed sensor 36, shown in FIG. 1, at another location, so that it does not sense the output rotational speed of the engine 10, but the rotational speed between the PST and the reversing unit or the rotational speed between the reversing unit and the clutch. In this case the algorithm explained in FIG. 2 for the calculation of the theoretical rotational speed at the input shaft of the clutch must be modified correspondingly. Also, the driveline may contain further components such as, for example, a vehicle direction control unit or reversing unit, a creeper transmission, a four-wheel drive transmission, a differential transmission and final drive reduction transmission. As far as the invention is concerned the sequence of the components of the driveline need not coincide with that of the aforementioned description. For example, the clutch may also be located immediately downstream of the engine. It is not necessary that the process steps be performed in the exact sequence described. It may be advantageous, for example, that the condition of the clutch is determined initially and the further steps in the process are then performed only if the clutch is disengaged.

We claim:

1. A transmission control system for controlling a power shift transmission (PST) in a vehicle driveline driven by an engine, the driveline including a clutch, a synchronized shift transmission and driven wheels, the PST being actuated by an actuating mechanism, the synchronized shift transmission being actuated in response to movement of a shift lever, the control system comprising:

a clutch sensor;

a first speed sensor for sensing a rotational speed of a part of the driveline between the engine and the clutch; and a second speed sensor for sensing a rotational speed of a part of the driveline between the clutch and the synchronized shift transmission; and a control unit having:

means for evaluating the signals of the clutch sensor in order to determine the engagement status of the clutch;

means for evaluating the signals of the speed sensors and determining a difference between the clutch input and output shaft rotational speeds for available gear ratios of the PST, means for selecting a gear of the PST which results in a lowest possible rotational speed difference, and means for transmitting control signals to the actuating mechanism for the automatic engagement of the selected gear, as long as the clutch is disengaged.

2. The transmission control system of claim 1, characterized by:

the first speed sensor senses a rotational speed of an output shaft of the engine;

the second speed sensor senses a rotational speed of an output shaft of the clutch; and the control unit comprising:

means for determining corresponding input speeds for the clutch from the first speed sensor and a gear ratio of the PST;

means for comparing the clutch input speeds with rotational speeds detected by the second speed sensor; and means for determining for each gear ratio an associated rotational speed variation as a function of the clutch input and output speeds.

3. The transmission control system of to claim 1, characterized by:

the control unit comprising means for continuously evaluating signals from the speed sensors and for calculating theoretical gear ratios for the PST for which equal rotational speeds would result on both sides of the clutch and which select a gear for the PST whose gear ratio approaches as closely as possible the theoretical gear ratio.

4. The transmission control system of claim 1, characterized by:

means for determining a gear status of the synchronized shift transmission; and the control unit comprising means for permitting shifting of the PST only if a shift in the synchronized shift transmission has been detected after the disengagement of the clutch.

5. The transmission control system of claim 1, characterized by:

a further speed sensor for sensing a rotational speed of an output shaft of the synchronized shift transmission and;

the control unit comprising means responsive to the second and further speed sensors for determining a ratio of the clutch output shaft speed and of the synchronized shift transmission output shaft speed, and for comparing the ratio to stored values of the available gear ratios of the PST in order to determine the gear engaged in the synchronized shift transmission.

6. The transmission control system of claim 1, characterized by:

a reversing unit controlled by an operating element, and a direction sensor for generating a direction signal representing a direction of operation of the reversing unit, the control system utilizing the direction signal in determining gear ratios.

7. The transmission control system of claim 1, further comprising:

a gear status indicator for displaying an indication of the particular gear engaged in the PST.

8. The transmission control system of according to one of the claim 1, further comprising:

an operating device for manually generating shift signals communicated to the actuating mechanism; and the control unit comprising means for overriding or suppress an automatic shifting of the PST upon actuation of the operating device.

9. The transmission control system of claim 8, wherein:

the operating device comprises a pair of manually operated push button switches; and the control unit comprising means for shifting the PST in response to actuation of the push button switches.

10. The transmission control system of claim 8, wherein:

the operating device comprises a pair of manually operated push button switches mounted on a handgrip portion of the shift lever.

11. A method for controlling a power shift transmission (PST) in a driveline of a engine driven utility vehicle, the driveline including a clutch having an input shaft and an output shaft, a synchronized shift transmission shiftable in response to manipulation of a shift lever, and driven vehicle wheels, the power shift transmission being shiftable by an actuating mechanism, and a transmission control system comprising a clutch sensor, a first speed sensor for sensing a rotational speed of a part of the driveline between the engine and the clutch, a second speed sensor for sensing a rotational speed of a part of the driveline between the clutch and the synchronized shift transmission, the method comprising the following steps:

determining an engagement status of the clutch on the basis of the signals from the clutch sensor, evaluating signals from the speed sensors in order to determine actual rotational speed variations between the clutch input and output shafts for available gear ratios of the PST, selecting a gear of the PST which results in a lowest possible rotational speed variation, and controlling the actuating mechanism of the PST to maintain or to automatically shift to the selected gear, as long as the clutch is disengaged.

12. The control method of claim 11, wherein:

the PST is located between the engine and the clutch, and the method further comprises:

calculating a speed of an input shaft of the clutch as a function of a signal from the first speed sensor and gear ratios of the PST; and comparing the calculated clutch input shaft speed to a speed signal from the second speed sensor, in order to determine for each gear ratio an associated speed variation value.

13. The control method of claim 11, wherein:

the signals of the first and second speed sensors are continuously evaluated;

theoretical gear ratios are calculated for the PST corresponding to equal rotational speeds on both sides of the clutch, and a gear is selected for the PST whose gear ratio comes as close as possible to the theoretical gear ratio.

14. The control method of claim 11, wherein:

for an upshift of the PST into a higher gear, a shift occurs at a higher clutch output shaft speed as under equal conditions during a downshift of the PST.

15. The control method of claim 14, wherein:

for an upshift of the PST into a higher gear the shift point lies at a higher rotational speed of the output shaft of the clutch as under equal conditions during a downshift of the PST.

16. The control method of claims 11, further comprising:

determining a currently engaged gear of the synchronized shift transmission; and permitting a shift of the PST only if, after the clutch is disengaged, a shift of the synchronized shift transmission has been detected.

17. The control method of claim 11, wherein:

the transmission control system further comprises speed sensors for sensing rotational speeds for input and output sides of the synchronized shift transmission; and the method comprising:

calculating a ratio of the rotational speeds for input and output sides of the synchronized shift transmission; and comparing said ratio to stored values of available gear ratios of the synchronized shift transmission, in order to determine whether a shift has occurred.

18. The control method of claim 11, wherein:

the transmission control system further comprises a manually operable operating device for generating shift signal for communication to the actuating mechanism; and the method comprising:

overriding or suppressing an automatic shift of the PST upon an actuation of the operating device.

19. The control method of claim 11, wherein:

the operating device comprises a pair of push button switches which generate shifting impulses for the manual upshifting or downshifting of the PST; and the method further comprising:

shifting the PST by one gear in response to actuation of one of the push button switches.

* * * * *